United States Patent
Bernauer et al.

(10) Patent No.: US 12,046,967 B2
(45) Date of Patent: Jul. 23, 2024

(54) STATOR FOR AN ELECTRIC MACHINE WITH A STRIP-LIKE WINDING UNIT FOR A STATOR WINDING, AND METHOD FOR PRODUCING SAME

(71) Applicant: SCHAEFFLER TECHNOLOGIES AG & CO. KG, Herzogenaurach (DE)

(72) Inventors: Richard Bernauer, Weilheim (DE); Stefan Rieß, Kaufering (DE); Johann Oswald, Eschenlohe (DE); Michael Menhart, Igling (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 311 days.

(21) Appl. No.: 17/611,729

(22) PCT Filed: Apr. 22, 2020

(86) PCT No.: PCT/DE2020/100328
§ 371 (c)(1),
(2) Date: Nov. 16, 2021

(87) PCT Pub. No.: WO2020/228890
PCT Pub. Date: Nov. 19, 2020

(65) Prior Publication Data
US 2022/0216758 A1 Jul. 7, 2022

(30) Foreign Application Priority Data

May 16, 2019 (DE) .......................... 102019112938.9
Aug. 28, 2019 (DE) .......................... 102019006057.1
Feb. 7, 2020 (DE) .......................... 102020103165.3

(51) Int. Cl.
*H02K 3/28* (2006.01)
*H02K 15/06* (2006.01)

(52) U.S. Cl.
CPC .............. *H02K 3/28* (2013.01); *H02K 15/064* (2013.01)

(58) Field of Classification Search
CPC ............................... H02K 3/28; H02K 15/064
See application file for complete search history.

(56) References Cited

U.S. PATENT DOCUMENTS

| 7,269,888 B2 | 9/2007 | Neet |
| 7,365,467 B2 | 4/2008 | Bramson et al. |
| (Continued) | | |

FOREIGN PATENT DOCUMENTS

| CN | 1531167 A | 9/2004 |
| CN | 101958588 A | 1/2011 |
| (Continued) | | |

OTHER PUBLICATIONS

International Search Report dated Jul. 23, 2020, PCT Application No. PCT/DE2020/100328 filed Apr. 22, 2020.

*Primary Examiner* — Tulsidas C Patel
*Assistant Examiner* — Mohammed Ahmed Qureshi
(74) *Attorney, Agent, or Firm* — Volpe Koenig

(57) ABSTRACT

A stator for an electric machine, comprising a stator core and a stator winding, wherein the stator core has a plurality of slots, which are spaced apart in a circumferential direction and have a depth running in the radial direction, and allows the arrangement of slot sections of the stator winding in a plurality of radially spaced-apart radial positions, wherein the stator has a strip-like winding unit comprising a first and a second winding conductor, wherein the two winding conductors run in a first and a second layer of the winding unit and each comprises:
a plurality of straight slot sections which run in a transverse direction of the winding unit and are arranged in parallel,
a plurality of first bent end sections which each interconnect two slot sections of the associated winding conductor and are arranged on a first longitudinal side of the winding unit, (Continued)

a plurality of second bent end sections which each interconnect two slot sections of the associated winding conductor and are arranged on a second longitudinal side of the winding unit, which second longitudinal side is situated opposite the first longitudinal side, wherein, the first and the second bent end sections each interconnect a slot section of the associated winding conductor in the first layer and a slot section of the associated winding conductor in the second layer, wherein a first slot section is arranged in a first slot in a first radial position, and a second slot section, which is directly connected to the first slot section by a first end section, is arranged in a second slot in a second radial position which is offset by two radial positions in relation to the first radial position.

15 Claims, 17 Drawing Sheets

(56) References Cited

U.S. PATENT DOCUMENTS

| | | | |
|---|---|---|---|
| 7,386,931 | B2 | 6/2008 | Neet et al. |
| 8,779,643 | B2 | 7/2014 | Umeda et al. |
| 11,605,989 | B2 | 3/2023 | Neet |
| 2004/0119362 | A1* | 6/2004 | Neet .................. H02K 3/24 |
| | | | 310/201 |
| 2005/0110360 | A1* | 5/2005 | Harpenau ............ H02K 3/28 |
| | | | 310/201 |
| 2006/0032040 | A1 | 2/2006 | Neet |
| 2006/0032044 | A1 | 2/2006 | Neet et al. |
| 2006/0226727 | A1 | 10/2006 | Bramson et al. |
| 2013/0214634 | A1 | 8/2013 | Hasegawa et al. |
| 2018/0233999 | A1 | 8/2018 | Ponzio et al. |
| 2021/0159743 | A1 | 5/2021 | Neet |

FOREIGN PATENT DOCUMENTS

| | | | |
|---|---|---|---|
| CN | 102265485 A | 11/2011 | |
| CN | 103262391 A | 8/2013 | |
| CN | 109075639 A | 12/2018 | |
| CN | 113853733 A | 12/2021 | |
| DE | 10 2004 056811 | 6/2005 | |
| DE | 60018368 T2 | 4/2006 | |
| DE | 602 08 387 T2 | 8/2006 | |
| DE | 112013006383 T5 | 9/2015 | |
| DE | 102016123067 A1 | 5/2018 | |
| EP | 1416610 A1 * | 5/2004 | ......... H02K 15/0478 |
| EP | 1416610 A1 | 5/2004 | |
| WO | 2022195080 A1 | 9/2022 | |

* cited by examiner

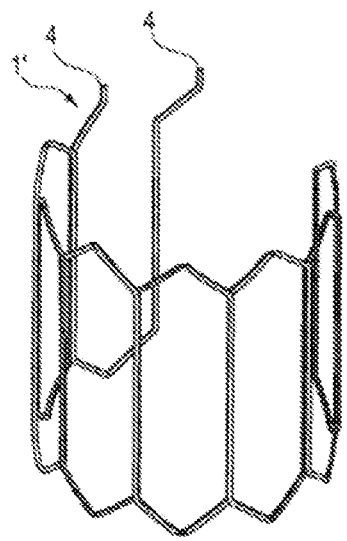 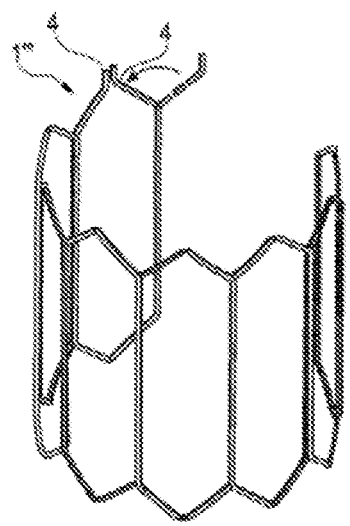
Fig. 12a  Fig. 13a
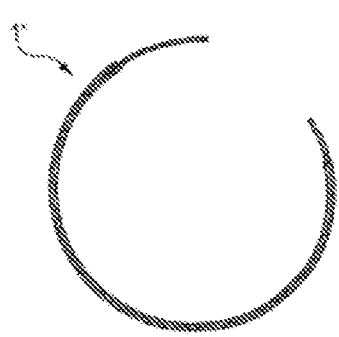 
Fig. 12b  Fig. 13b

STATOR FOR AN ELECTRIC MACHINE WITH A STRIP-LIKE WINDING UNIT FOR A STATOR WINDING, AND METHOD FOR PRODUCING SAME

CROSS-REFERENCE TO RELATED APPLICATIONS

This application is the U.S. National Phase of PCT Appln. No. PCT/DE2020/100328 filed Apr. 22, 2020, which claims priority to DE 102019006057.1 filed Aug. 28, 2019, priority to DE 10 2019 112 938.9 filed May 16, 2019 and DE 10 2020 103 165.3 filed Feb. 7, 2020, the entire disclosures of which are incorporated by reference herein.

FIELD

The disclosure relates to a stator with a strip-like winding unit for a stator winding having a first and second winding conductor, wherein both winding conductors are guided in a first and a second layer of the winding unit. The disclosure also relates to a winding method for such a stator.

BACKGROUND

Strip-like winding units are used, to produce bar wave windings in electrical machines and enable an efficient production of large numbers of such machines. The strip-like winding units are usually prefabricated and correspond to parts of a stator winding to be produced. The prefabricated winding units are typically inserted individually into the slots of a stator core and, after they have been introduced, are interconnected to form the stator winding.

Examples of such winding units are known from U.S. Pat. Nos. 8,779,643 B2, 7,386,931 B2, 7,269,888 B2 and 7,365,467 B2. These strip-like winding units comprise a plurality of slot sections which run straight in a transverse direction of the winding unit and are arranged in parallel to one another. These straight slot sections can then be introduced into slots of a stator core to form a stator winding. The winding unit also comprises a plurality of first bent end sections which each interconnect two slot sections and are arranged on a first longitudinal side of the winding unit, and a plurality of second bent end sections which each interconnect two slot sections and are arranged on a second longitudinal side of the winding unit opposite the first longitudinal side. By means of these bent end sections, an undulating course of the winding conductor can be obtained. Because of this geometry, windings with winding units of this type are also referred to as wave windings.

The known winding units are often very long, so that they extend several times around the circumference of the stator. This is associated with high manufacturing cost. Another disadvantage of the known winding units is that they generally have a large number of layers, which makes further processing more difficult, in particular the introduction of the winding units into the stator core.

Against this background, the object arises of reducing the effort involved in the manufacture of electrical machines.

SUMMARY

The object is achieved by a stator with a strip-like winding unit having the features according to claim 1. In addition, the object is achieved by a winding method for a stator of an electrical machine having the features according to claim 11. Advantageous embodiments can be found in the dependent claims.

The strip-shaped winding unit according to the disclosure for a stator winding comprises a first and a second winding conductor, both winding conductors being guided in a first and a second layer of the winding unit. In this context, the first and second layer are to be understood as the respective vertical position of the winding conductors, which results when the strip-like winding unit is positioned on a horizontal plane and therefore outside the stator. Both winding conductors comprise a plurality of slot sections running straight in a transverse direction of the winding unit, which are arranged in parallel to one another, as well as a plurality of first bent end sections, which each interconnect two slot sections of the associated winding conductor and are arranged on a first longitudinal side of the winding unit, and a plurality of second bent end sections, each of which interconnects two slot sections of the associated winding conductor and is arranged on a second longitudinal side of the winding unit opposite the first longitudinal side.

A special feature of the winding unit according to the disclosure is that the first and second bent end sections each interconnect a slot section of the associated winding conductor in the first layer and a slot section of the associated winding conductor in the second layer. When the strip-like winding unit is arranged on a horizontal plane surface, the first and second bent end portions each connect a slot portion of the lower layer with a slot portion of the upper layer.

It is important in connection with the disclosure that the layer is not to be confused with the radial position of the slot sections in the stator slots. The layer basically defines the vertical position of the slot sections of a strip-like winding unit outside the stator when the winding unit extends vertically over a horizontal plane. After the strip-like winding unit is introduced into the stator, the original layers of the slot sections are transferred into radial positions, which are not only dependent on the previous layer but also on the arrangement of the winding unit in relation to any other strip-like winding units arranged in the stator. After the strip-like winding unit has been inserted into the stator core, the slot sections of a specific layer, for example the first layer of the strip-like winding unit, can thus assume different radial positions in the slots.

Since the slot sections running in the transverse direction in the strip-like winding unit are each arranged in one of only two layers, a strip-like winding unit is produced with a small thickness, in particular with a thickness of only two layers. This results in a winding unit which can be introduced into the slots of a stator core with less effort.

The stator according to the disclosure for an electrical machine further comprises a stator core and a stator winding, wherein the stator core has a plurality of slots spaced apart in a circumferential direction, having a depth extending in the radial direction and enabling slot sections of the stator winding to be arranged in a plurality of radially spaced radial positions, wherein the stator winding has a strip-like winding unit as described above. The slot sections thereof are preferably received in the slots of the stator core in such a way that the strip-like winding unit is arranged in a spiral shape in the stator core.

In one embodiment of the strip-like winding unit, the two winding conductors are interconnected to form what is known as a reverse winding via a third bent end section at a reversal point. The third bent end section differs from the first and second end sections in that it does not just interconnect slot sections of different layers. Rather, either a respective slot section of the first and second winding conductors in the first layer or a respective slot section of the first and second winding conductors in the second layer are interconnected via the third bent end section. Such a reverse winding accordingly comprises, as bent end sections, only first and second bent end sections, which each interconnect slot sections of different layers and interconnects exactly one bent end section—the third bent end section—of the slot sections of the same layer. The third bent end section is at the reversal point of the reverse winding.

In this context, too, it should be pointed out once again that the third bent end section may very well interconnect slot sections of different radial positions. It is crucial that the third bent end section connects slot sections in the same layer of the strip-like winding unit when this is arranged to be spread out vertically on a horizontal plane outside the stator.

The formation of a reversal point of the winding conductor makes it possible for the winding unit to have two winding connections which are provided on the same longitudinal side of the strip-like winding unit and in the same layer of the winding unit. When the winding unit is arranged in a stator core, these winding connections can be arranged on the same end face of the stator core and either both radially inward or both radially outward, so that the effort for contacting the winding connections is reduced.

In the context of the disclosure, a straight slot section is understood to mean a straight section of the winding wire which can be introduced into a slot of a stator core to form a stator winding. Such slot sections are preferably spaced apart from one another in parallel over identical distances.

In the context of the disclosure, a bent end section is an end section that does not run straight. The end section can effect a reversal of the winding conductor by essentially 180°. The bent end section can have an arc-like curvature and/or a bending point. For example, the bent end section can comprise a first and a second essentially straight subsection, which are interconnected via a bending point. With such bent end sections that interconnect a slot section in the first layer and a slot section in the second layer, it is preferable that the first straight subsection is arranged in the first layer and the second straight subsection in the second layer so that a change of position at the bending point is realized within the winding unit.

The fact that the strip-like winding unit is preferably arranged in the form of a spiral in the stator core means, in the sense of an embodiment of the winding unit without reverse winding, that the individual slot sections of the winding unit are received in different radial positions in the slots of the stator core, that a first radial position of a first slot section, the one having a greater distance from one end of the associated winding conductor is radially further out than a second radial position of a second slot section, which has a smaller distance from the end of the associated winding conductor.

A third radial position of a third slot section is preferably located radially farther inward than the second radial position, wherein the third slot section is at an even smaller distance from the reversal point or respective end of the winding conductor than the second slot section. In this respect, the individual slot sections of the winding unit are received in different radial positions in the slots of the stator core such that the radial positions of the slot sections are provided radially further inward with decreasing distance from the reversal point of the winding unit or the end of the respective winding conductor.

The stator core of the stator is preferably designed as a laminated core.

In the stator according to the disclosure it is further provided that a first slot section is arranged within a first slot in a first radial position and a second slot section connected to the first slot section directly via a first end section is arranged within a second slot in a second radial position, which is offset by two radial positions opposite to the first radial position. In this respect, there is an offset by two radial positions between two adjacent slot sections of the same winding wire. This makes it possible for an intermediate radial position, offset by one radial position from the first radial position, to be occupied by another slot section of the same winding wire, for example by a slot section of the same winding wire which is indirectly connected to the first and second slot sections via the reversal point if this is available.

In this context, it is advantageous if a third slot section is arranged in the first slot in a third radial position, which is offset by one radial position from the first radial position, and a fourth slot section directly connected to the third slot section via a second end section in the second slot is arranged in a fourth radial position, which is identical to the third radial position. By occupying the radial positions in this way, it becomes possible to enable a collision-free passage by of a forward section of the winding wire to the reversal point and a return section of the winding wire, provided that a reverse winding is provided.

According to an advantageous embodiment it is provided that a fifth slot section directly connected to the second slot section via a second end section is arranged in a third slot in a fifth radial position which is identical to the second radial position. In this respect, there is initially an offset of two radial positions between the first and second slot sections of the same winding wire and no offset between the second and fifth slot sections. It is preferably provided that a sixth slot section, which is directly connected to the fifth slot section via a first end section, is arranged in a fourth slot in a sixth radial position which is offset by two radial positions relative to the second or fifth radial position. In this respect, there is initially an offset of two radial positions between the first and second slot sections of the same winding wire, no offset between the second and fifth slot sections, and an offset of two radial positions between the fifth and sixth slot sections.

An alternative, advantageous embodiment provides that a first slot section is arranged in a first slot in a first radial position, and a second slot section, which is directly connected to the first slot section via a second end section, is arranged in a second slot in a second radial position, which is opposite the first radial position offset by two radial positions, a third slot section is arranged in the first slot in a third radial position, which is offset from the first radial position by one radial position, and a fourth slot section directly connected to the third slot section via a first end section in the second slot is arranged in a fourth radial position, which is identical to the third radial position.

In this context, it is advantageous if a fifth slot section, which is directly connected to the second slot section via a first end section, is arranged in a third slot in a fifth radial position which is identical to the second radial position. As discussed above in connection with the first alternative, there is initially an offset by two radial positions between the first and second slot sections of the same winding wire and no offset between the second and fifth slot sections. It is preferably provided that a sixth slot section directly connected to the fifth slot section via a second end section is arranged in a fourth slot in a sixth radial position which is offset by two radial positions from the second or fifth radial position. In this respect, there is initially an offset of two radial positions between the first and second slot sections of the same winding wire, no offset between the second and fifth slot sections, and an offset of two radial positions between the fifth and sixth slot sections.

According to an advantageous embodiment of the disclosure, it is provided that the first winding conductor has two connection sections, which are either both arranged on the first longitudinal side or both are arranged on the second longitudinal side. The winding conductor of the winding unit can be contacted via the connection sections. The arrangement of the connection sections on the same side facilitates the contacting of the connection sections, in particular the contacting of connection sections of a first strip-like winding unit with a second strip-like winding unit.

In this context, it is advantageous if the connection sections are either both arranged in the first layer or both are arranged in the second layer. By arranging the connection sections in the same layer, it becomes possible that the connection sections can all be arranged radially on the outside when the winding unit is arranged in a stator core. This can reduce the effort involved in making contact with the connection sections. Alternatively, the connection sections can all be arranged radially on the inside in the stator core. As a further alternative, it is possible for a first of the two connection sections to be arranged in the first layer and a second of the two connection sections to be arranged in the second layer.

A preferred embodiment of the disclosure provides that the winding unit comprises one or more further winding conductors which are identical to the first and second winding conductors and are offset in such a way that the first, second, and further winding conductors are arranged in the same first and second layer of the winding unit, and that the slot sections thereof are arranged at the distance of the slots of the stator to one another. The slot sections of the further winding conductors are arranged to be offset with respect to the slot sections of the first and second winding conductors. Thus, a winding unit having a plurality of winding wires can be obtained which has a small thickness of only two layers. Such a winding unit with a plurality of winding wires will also be referred to below as a winding mat. The slot sections of the winding conductors of such a winding mat, apart from the slot sections arranged in the edge region, lie on top of one another in pairs and are laterally spaced apart from one another which corresponds to the spacing-apart of the stator slots. The winding wires of the winding unit can optionally be interconnected in series or in parallel. For this purpose, the connection sections of the first winding conductor, the second winding conductor, and the one or more further winding conductors are preferably interconnected in a suitable manner. For example, as described above, the first and second winding conductors can be interconnected to form a reverse winding at a reversal point. Using 16 further winding conductors, two of which are always connected to form a reverse winding, a winding mat with a total of 9 reverse windings can be produced, which can be arranged with respect to one another with an offset in the longitudinal direction by one slot pitch. As a consequence, all winding conductors are also distributed here over said first and second layers of the winding unit.

Of course, however, the various winding conductors can also be interconnected to form a winding mat without being connected in pairs at a reversal point. Various configurations using series and/or parallel connections are conceivable here to optimally adapt a winding mat to the operational requirements of an electrical machine.

In a further embodiment of the disclosure, the stator comprises at least one further winding unit which is identical to the winding unit described above and is arranged to be offset relative thereto in the circumferential direction of the stator. The winding unit and the further winding unit thus form two winding mats. One of the winding mats attaches to a first slot on the inner circumference of the stator, while the other winding mat attaches to a second slot on the inner circumference of the stator, wherein the first slot and the second slot are different. If, for example, the first winding mat is now guided over the second slot, this second slot is occupied both with two conductors of the first winding mat and with two conductors of the second winding mat. In other words, in such a configuration, a slot section arranged on the outer edge of the further winding unit is arranged in the second slot and a further slot section of the further winding unit connected to the outer edge of the further winding unit via a first or second bent end section is arranged in the third slot. This has the consequence that a first slot section of the first winding mat is arranged in a first slot in a first radial position and a second slot section, which is connected to the first slot section directly via a first end section, is arranged in the second slot in a second radial position, which is opposite the first radial position, and is offset by two radial positions. Here, a third slot section of the first winding mat is arranged in the first slot in a third radial position, which is offset by one radial position from the first radial position, and a fourth slot section, which is directly connected to the third slot section via a second end section, is arranged in the second slot in a fourth radial position, which is identical to the third radial position.

Furthermore, the object is achieved by a winding method for a stator of an electrical machine, in which the following method steps are carried out:

First of all, at least one first and one second winding unit are produced, each of which has at least a first and a second winding conductor. The generation takes place in such a way that the first and second winding conductors are guided in a first and a second layer of the respective winding unit. The winding conductors are designed in such a way that they each have a plurality of slot sections which run straight in a transverse direction of the winding unit, and which are arranged in parallel to one another. Furthermore, a plurality of first bent end sections are produced which each interconnect two slot sections of the associated winding conductor and are arranged on a first longitudinal side of the winding unit. In addition, a plurality of second bent end sections are produced which each interconnect two slot sections of the associated winding conductor and are arranged on a second longitudinal side of the winding unit opposite the first longitudinal side.

The slot sections of the first winding unit are arranged in a plurality of slots of a stator core that are spaced apart in a circumferential direction. The slot sections of the second winding unit are also arranged in a plurality of slots of the stator core that are spaced apart in a circumferential direction. This is done in such a way that the second winding unit comes to lie with an offset in the circumferential direction in the interior of the stator with respect to the first winding unit, and slot sections of the first and second winding units are arranged in the same slots. This offset can be designed such that within each of the strip-like winding units, a first slot section is arranged in a first slot in a first radial position, and a second slot section, which is directly connected to the first slot section via a first end section, is arranged in a second slot in a second radial position which is offset from the first radial position by two radial positions.

To introduce the first and second winding units into an essentially cylindrical stator, it can be expedient to apply the first and second winding units offset to one another in the circumferential direction onto a cylindrical transmission mandrel. This transmission mandrel can be moved axially into the interior space enclosed by the stator core. The winding units can subsequently be expanded radially outward from the transmission mandrel into the slots of the stator core.

BRIEF DESCRIPTION OF THE DRAWINGS

Further details and advantages of the disclosure will be explained below with reference to the exemplary embodiment shown in the drawings.

In the figures:

FIGS. 12a and b show the winding unit according to FIG. 3 to illustrate the arrangement in a stator core in a perspective illustration and a top view of a longitudinal side or front side;

FIGS. 13a and b show a winding unit according to a fourth exemplary embodiment to illustrate the arrangement in a stator core in a perspective illustration and a top view of a longitudinal side or front side;

DETAILED DESCRIPTION

Figures 1, 2:
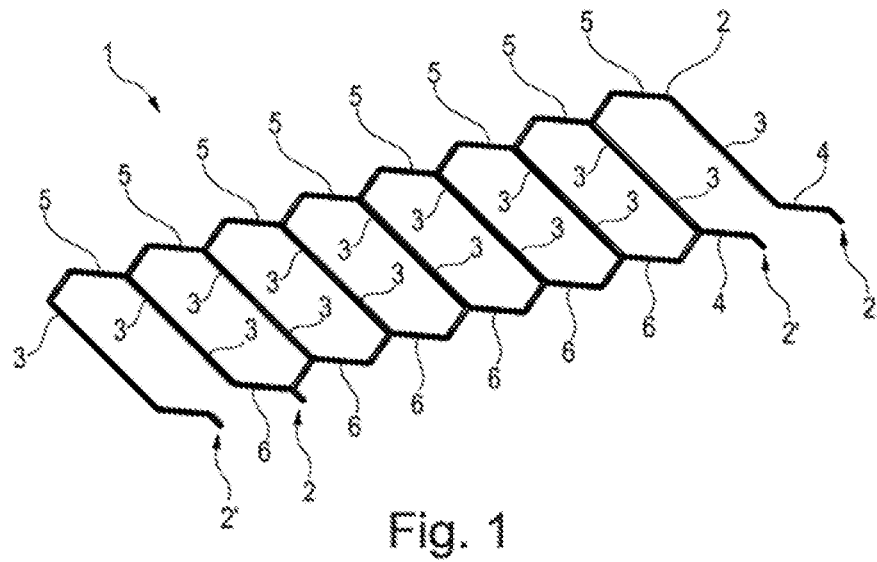
FIG. 1 shows a strip-like winding unit according to a first exemplary embodiment of the disclosure in a perspective illustration.
FIG. 2 shows the winding unit according to FIG. 1 in a side view.

FIGS. 1 and 2 show a strip-like winding unit 1 according to an exemplary embodiment of the disclosure with a first and a second 2, 2', which are guided in a first layer L1 and a second layer L2 of the winding unit 1. The beginning and end of the two winding conductors 2, 2' are each marked with an arrow for orientation. Both winding conductors 2, 2' of the winding unit 1 comprise a plurality of slot sections 3 which run straight in a transverse direction Q of the winding unit 1 and are arranged in parallel to one another. The distance between the slot sections 3 of the winding conductors 2, 2' is dimensioned such that adjacent slot sections 3 can be introduced into different stator slots of a stator core of an electrical machine. The slot sections 3 are interconnected via end sections 5, 6 which, in a state in which the slot sections 3 of the winding unit 1 that are introduced into the stator slots of a stator core, protrude from the stator core at the end.

The slot sections 3 are interconnected on a first longitudinal side of the winding unit 1 via a plurality of first bent end sections 5. The first bent end sections 5 each interconnect a first slot section 3 in the first layer L1 and a second slot section 3 in the second layer L2 of the respective winding conductors 2, 2'. In this respect, a change of position of the associated winding conductor 2, 2' is made possible by the first end sections 5. On a second longitudinal side of the winding unit 1 opposite the first longitudinal side, a plurality of second bent end sections 6 are provided, which each interconnect two slot sections 3 and are arranged on a second longitudinal side of the winding unit 1 opposite the first longitudinal side. All of the second bent end sections 6 each interconnect a first slot section 3 in the first layer L1 and a second slot section 3 in the second layer L2 of the associated winding conductor 2, 2'. Initially, no galvanic connection is provided between the two winding conductors 2, 2' within the winding unit. The beginning and end of the winding conductors 2, 2' are available for any connection, in particular after a complete winding mat has been inserted. For example, a series connection or parallel connection of the winding conductors 2, 2' is conceivable.

Figure 3:
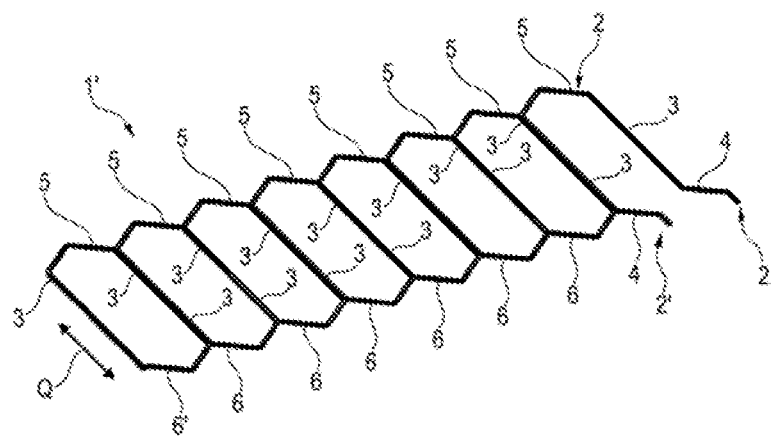
FIG. 3 shows a strip-like winding unit according to a second exemplary embodiment of the disclosure in a perspective illustration.
Figure 4:
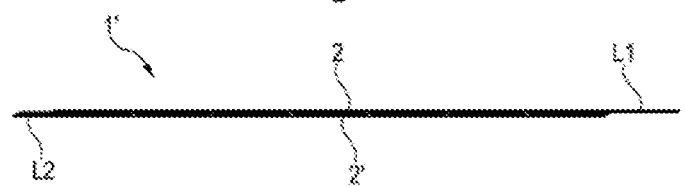
FIG. 4 shows the winding unit according to FIG. 3 in a top view of a longitudinal side.
Figure 5:
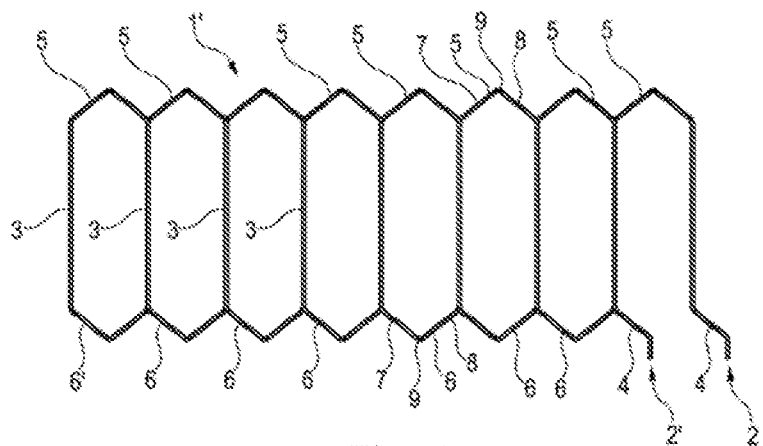
FIG. 5 shows the winding unit according to FIG. 3 in a side view.

FIGS. 3, 4 and 5 show a strip-like winding unit 1' according to an exemplary embodiment of the disclosure, in which the two winding conductors 2, 2' are interconnected at a reversal point via a third bent end section 6'. What is termed a reverse winding is created in this way. The winding conductors 2, 2' are also guided here in a first layer L1 and a second layer L2 of the winding unit 1', as can be clearly seen in FIG. 4. The winding unit 1' in turn comprises a plurality of slot sections 3 which run straight in a transverse direction Q of the winding unit 1 and are arranged in parallel to one another. The distance between the slot sections 3 of the winding conductors 2, 2' is dimensioned such that adjacent slot sections 3 can be introduced into different stator slots of a stator core of an electrical machine. The slot sections 3 are interconnected via end sections 5, 6, 6' which, in a state in which the slot sections 3 of the winding unit 1 are introduced into the stator slots of a stator core, protrude from the stator core at the end.

The slot sections 3 are interconnected on a first longitudinal side of the winding unit 1' via a plurality of first bent end sections 5. The first bent end sections 5 each interconnect a first slot section 3 in the first layer L1 and a second slot section 3 in the second layer L2. In this respect, the first end section 5 enables a change of position of the respective winding conductors 2, 2', which form the reverse winding. A plurality of second bent end sections 6, 6' are provided on a second longitudinal side of the winding unit 1' opposite the first longitudinal side, each of which interconnect two slot sections 3 and are arranged on a second longitudinal side of the winding unit 1' opposite the first longitudinal side. Exactly one second bent end section 6' is designed to form a reversal point of the winding conductor formed from the winding conductors 2, 2' in such a way that it connects two slot sections 3 with one another in the second layer L2, one of which is assigned to the first winding conductor 2 and one is assigned to the second winding conductor 2'. All other second bent end sections 6, however, each connect a first slot section 3 in the first layer L1 and a second slot section 3 in the second layer L2 of the first winding conductor 2 or of the second winding conductor 2'.

According to a modification of this exemplary embodiment, it can be provided that the second bent end section 6' provided for forming the reversal point interconnects two slot sections in the first layer.

The strip-like winding unit 1' thus has a forward and return conductor formed from two winding conductors 2, 2', which, starting from a first connection section 4 up to the reversal point, describes an undulating course. The conductor turns around at the reversal point and then, starting from the reversal point up to a second connection section 4, again describes an undulating course.

The bent end sections 5, 6, 6' of the winding unit 1' cause the conductor to be reversed by essentially 180°. The bent end sections 5, 6, 6' each comprise a first, essentially straight subsection 7 and a second, essentially straight subsection 8, which are interconnected via a bending point 9.

The winding conductors 2, 2' furthermore comprise two connection sections 4, via which contact can be made with the reverse winding formed in this way. In the present exemplary embodiment, the connection sections 4 are both arranged on the second longitudinal side of the winding unit 1 and both are provided in the same—here the first layer L1 of the winding unit 1.

Figure 6:
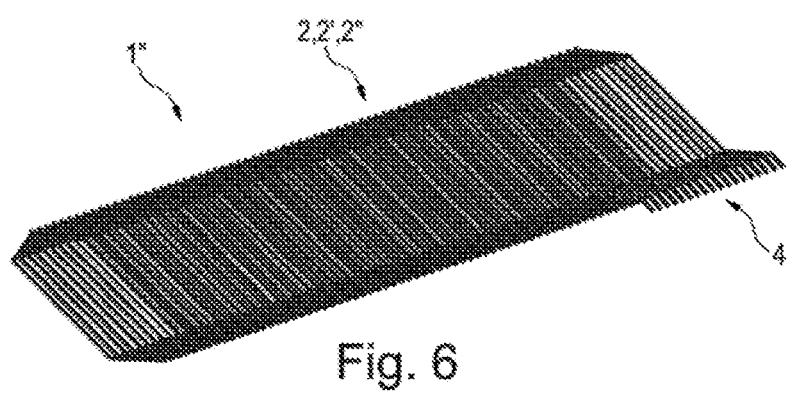
FIG. 6 shows a strip-like winding unit according to a third exemplary embodiment of the disclosure in a perspective illustration.
Figure 7:
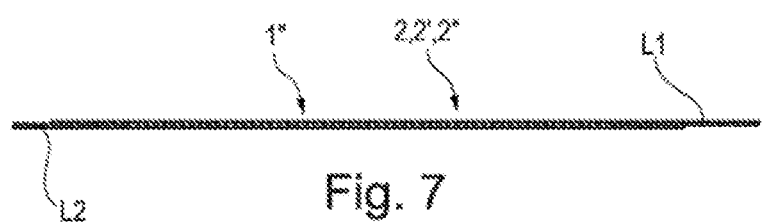
FIG. 7 shows the winding unit according to FIG. 6 in a top view of a longitudinal side.
Figure 8:
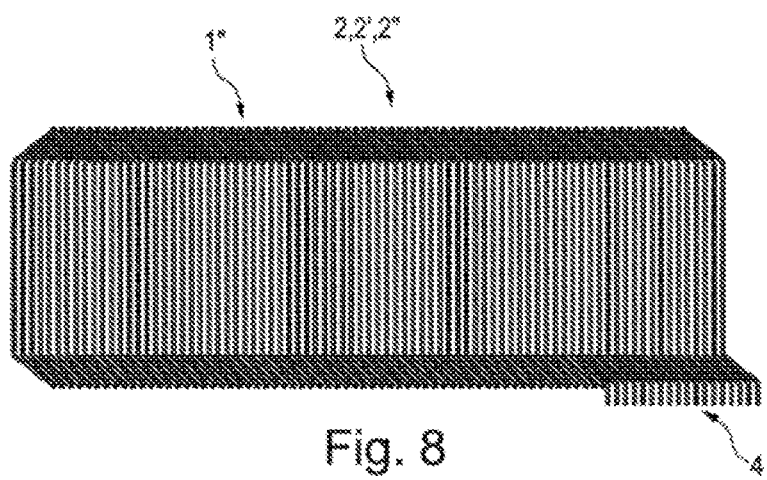
FIG. 8 shows the winding unit according to FIG. 6 in a side view.

The illustrations in FIGS. 6, 7, and 8 show a third exemplary embodiment of a strip-like winding unit 1", which differs from the winding unit 1' according to the second exemplary embodiment in that, in addition to the first and second winding conductors 2, 2', it comprises a plurality of other winding conductors 2". Here, too, the first and second winding conductors 2, 2' again form a reverse winding. In an identical manner, a further reverse winding is formed from two further winding conductors 2".

The further reverse winding is therefore identical to the reverse winding which is formed from the first and second winding conductors. It is arranged to be offset in such a way that the winding conductors 2, 2' of the reverse winding and the winding conductors 2" of the further reverse winding are arranged in the same first layer L1 and the same second layer L2 of the winding unit 1". In this respect, the winding unit 1" forms a winding mat with a plurality of winding conductors 2, 2', 2" which can be contacted via a large number of connection sections 4. The slot sections of these winding conductors 2, 2', 2" are arranged at the spacing of the slot division in the lateral direction.

A spiral arrangement of a strip-shaped winding unit 1' according to the second exemplary embodiment in a stator core 11 of a stator 10 is to be explained below with the aid of the representations in FIGS. 9 and 10. The figures illustrate how the previously described layers of the slot sections in a strip-like winding unit, which is arranged on a horizontal plane and extends vertically over this, are transferred into radial positions within the stator slots. The stator 10 and stator core 11 are only indicated schematically in FIG. 9 for reasons of clarity. The lines running in the radial direction correspond to the individual slots of the stator core 11, which are provided at a distance in the circumferential direction of the stator core 11. The stator slots have a depth in the radial direction which allows the winding unit 1' to be arranged in one of eight different radial positions. FIG. 10 shows schematically the eight different radial positions RP over ten different slots N, in which the slot sections of the winding conductors 2, 2' are arranged. The slot sections 3 of the first winding conductor 2 in the area between a first connection section 4 (outgoing) and the reversal point are marked with the reference symbol A, while the slot sections 3 of the second winding conductor 2' in the area between the reversal point and a second connection section 4 (return) are marked with the reference symbol B. It can be seen that the two areas of the reverse winding formed from the winding conductors 2, 2', that is to say the forward and the return, are interwoven on two layers of the winding unit 1. Due to the spiral arrangement of the winding unit 1', the two layers now extend over eight radial positions of the slots N.

It can be seen that a first slot section 3, A is arranged in a first slot N=10 in a first radial position RP=1 and a second slot section 3, A, which is directly connected to the first slot section 3, A via a first end section 5, is arranged in a second slot N=19 in a second radial position RP=3, which is offset from the first radial position RP=1 by two radial positions. A third slot section 3, B is arranged in the first slot N=10 in a third radial position RP=2, which is offset by one radial position from the first radial position RP=1, and a fourth slot section 3, B directly connected to the third slot section 3, B via a second end section 6 is arranged in the second slot N=19 in a fourth radial position RP=2, which is identical to the third radial position RP=2. Furthermore, a fifth slot section 3, A directly connected to the second slot section 3, A via a second end section 6 is arranged in a third slot N=28 in a fifth radial position RP=3, which is identical to the second radial position RP=3. This scheme continues until the reversal point is reached: A sixth slot section 3, A connected to the fifth slot section 3, A via a first end section 5 is arranged in a fourth slot N=37 in a sixth radial position RP=5, which is offset by two radial positions compared to the fifth radial position RP=3. A seventh slot section 3, A directly connected to the sixth slot section 3, A via a second end section 6 in a fifth slot N=46 is arranged in a seventh radial position RP=5, which is identical to the sixth radial position RP=5. An eighth slot section 3, A connected to the seventh slot section 3, A via a first end section 5 is arranged in a sixth slot N=55 in an eighth radial position RP=7, which is offset by two radial positions compared to the seventh radial position RP=5. A ninth slot section 3, A directly connected to the eighth slot section 3, A via a second end section 6 in a seventh slot N=64 is arranged in a ninth radial position RP=7, which is identical to the eighth radial position RP=7. Finally, a first end section 5 connects the ninth slot section 3, A in the seventh slot N=64 with a tenth slot section 3, A in an eighth slot N=73. A second end section 6' connects the tenth slot section 3, A with an eleventh slot section 3, B in the seventh slot N=73, wherein the eleventh slot section 3, B has a radial position RP=8, which is identical to the radial position N=8 of the tenth slot section 3, A.

Figure 9:
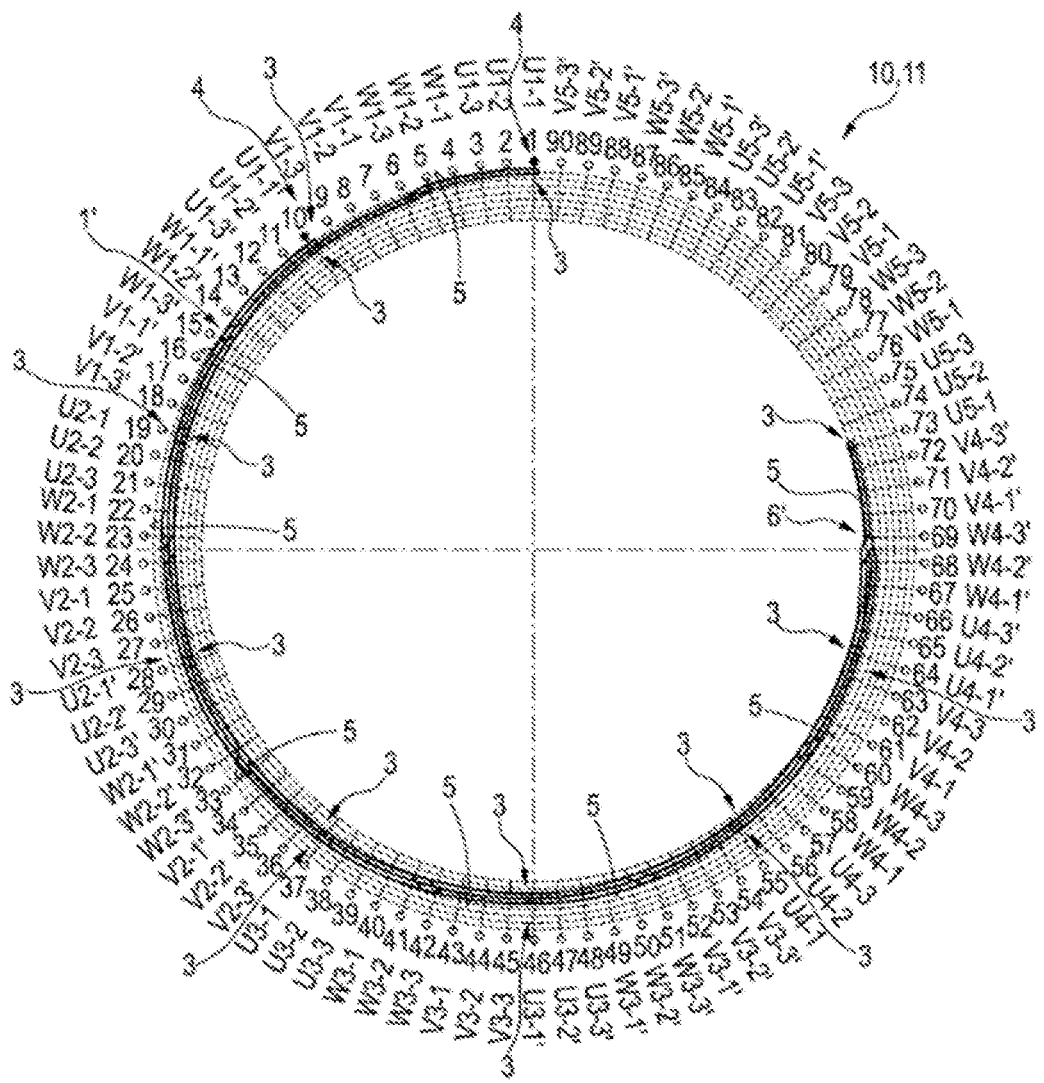
FIG. 9 shows a stator according to a first exemplary embodiment of the disclosure with a strip-like winding unit according to FIG. 3 in a schematic sectional illustration.
Figure 10:
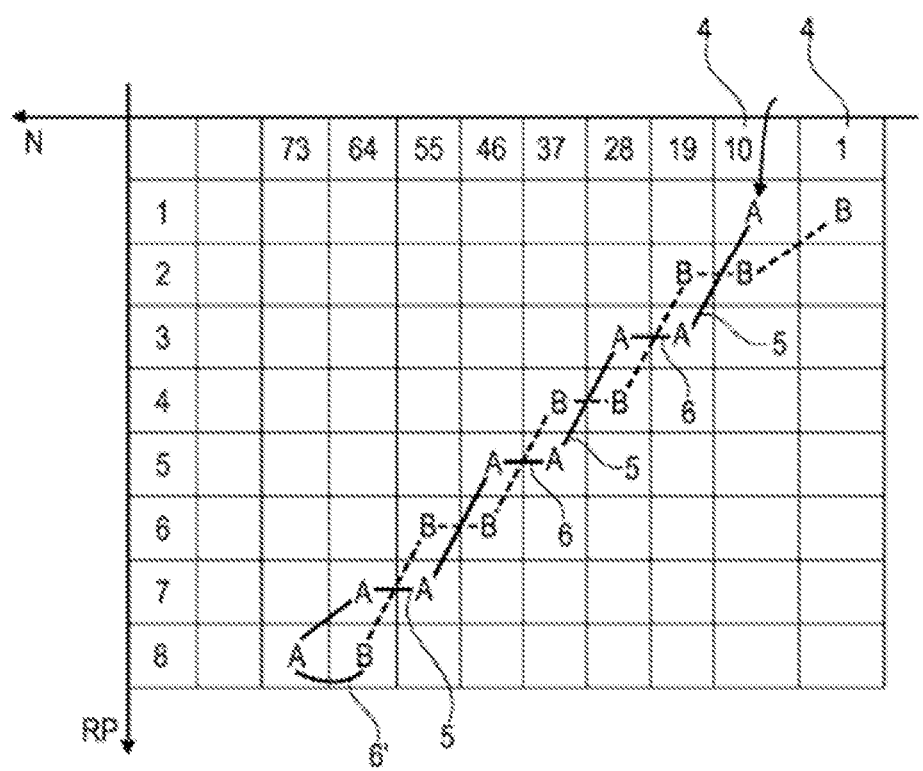
FIG. 10 shows a diagram to illustrate the arrangement of the winding unit according to FIG. 3 in the stator according to FIG. 9.
Figure 11:
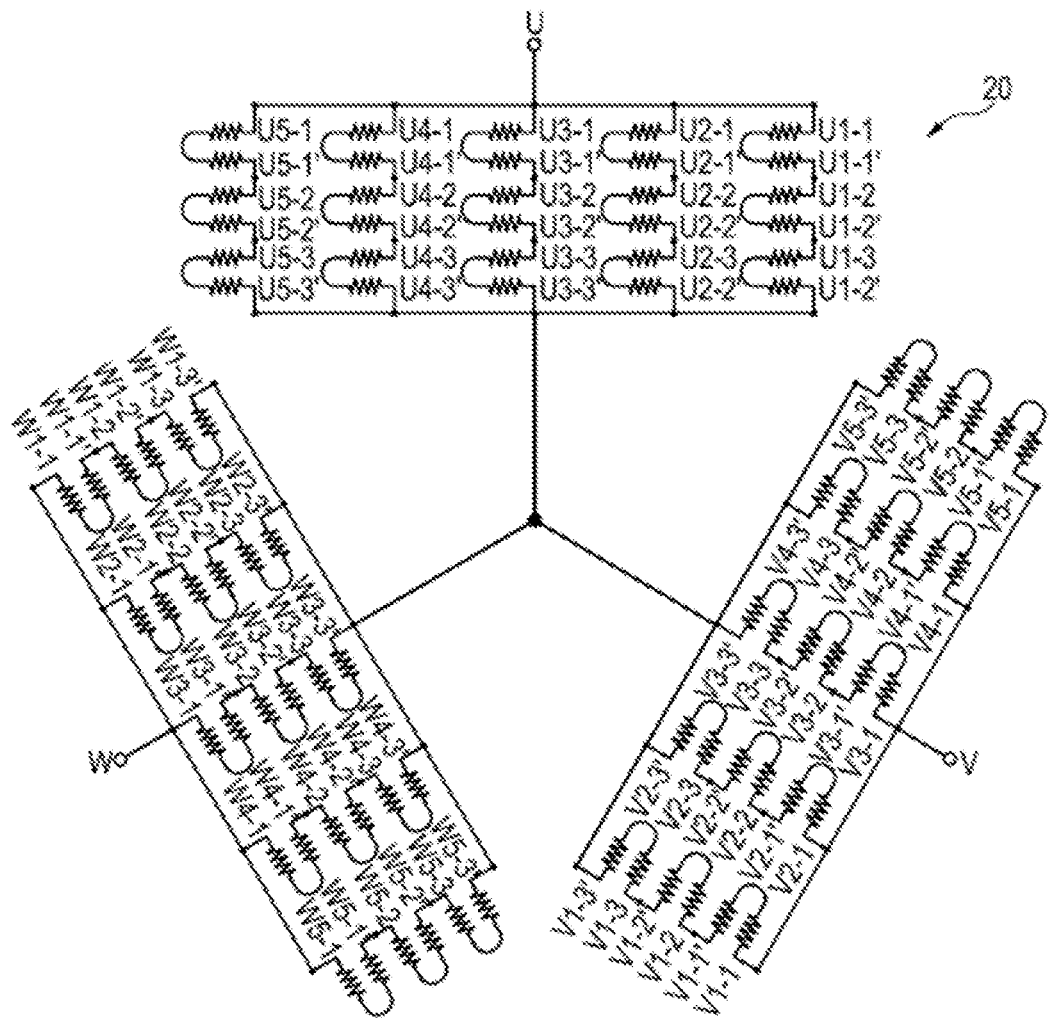
FIG. 11 shows a stator winding in circuit diagram.

The illustration in FIG. 11 shows, by way of example, a structure of a stator winding 20 from a plurality of strip-like winding units, wherein the winding unit shown in FIGS. 9 and 10 is denoted by the reference symbol U1-1.

In FIGS. 12a and 12b, the strip-like winding unit 1' according to FIG. 3 is shown again, wherein the winding unit 1' is arranged in a spiral to illustrate the arrangement of the winding unit 1' in a stator core, not shown here. FIG. 12a shows a perspective illustration and FIG. 12b shows a top view of a longitudinal side or front side of the stator. The strip-like winding unit 1' has two connection areas 4 which are spaced apart by a distance which essentially corresponds to the distance between the slot areas 3 of the winding conductors 2, 2'.

FIGS. 13a and 13b show a modification of the strip-like winding unit 1' according to FIG. 3, wherein the winding unit 1''' is arranged in a spiral to illustrate the arrangement of the winding unit in a stator core, not shown here. FIG. 13a shows a perspective illustration and FIG. 13b shows a top view of a longitudinal side or front side of the stator. In contrast to FIGS. 12a and 12b, the strip-like winding unit 1''' has two connection areas 4 which are spaced apart by a distance which is smaller than the distance between the slot areas 3 of the winding conductors 2, 2'.

Figures 14A, 15A:
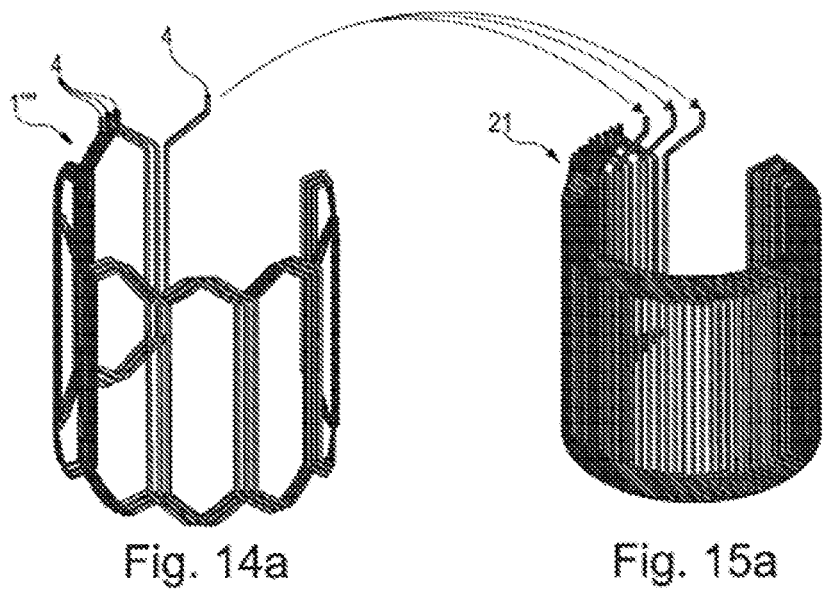
FIGS. 14a and b show a winding unit according to a fifth exemplary embodiment to illustrate the arrangement in a stator core in a perspective illustration and a top view of a longitudinal side or front side.
FIGS. 15a and b show part of a stator winding to illustrate the arrangement in a stator core in a perspective illustration and a top view of a longitudinal side or front side.
Figures 14B, 15B:
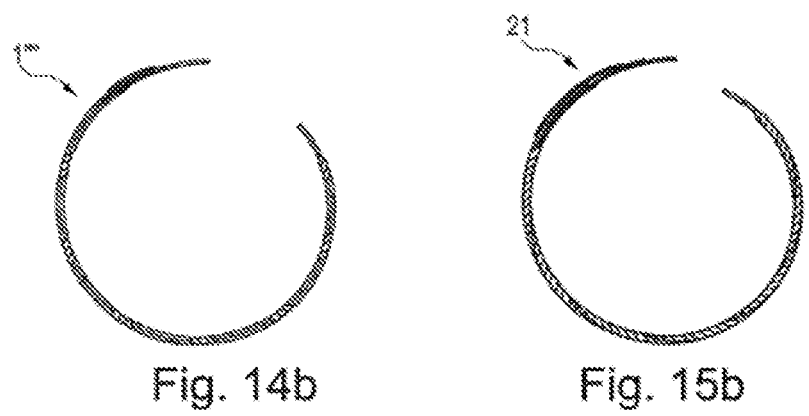

FIGS. 14a and 14b show a winding unit 1'''' according to a fourth exemplary embodiment. FIG. 14a shows a perspective illustration and FIG. 14b shows a top view of a longitudinal side or front side of the stator. This winding unit comprises a winding unit 1' according to FIG. 12a and two winding units 1''' according to FIG. 13a, which are each arranged to be offset, so that a winding unit 1'''' with two layers is obtained. The connection sections 4 of the individual winding units 1', 1''' are connected in such a way that a series connection of the three winding units 1', 1''' is obtained. The winding unit 1'''' corresponds to one phase of the stator according to FIG. 11.

The illustration in FIGS. 15a and 15b shows part 21 of a stator winding 20 to illustrate the arrangement in a stator core. FIG. 15a shows a perspective illustration and FIG. 15b shows a top view of a longitudinal side or front side of the stator. The part 21 comprises the winding units 1'''' according to FIG. 14a, which are arranged to be offset in each case.

Figure 16A:
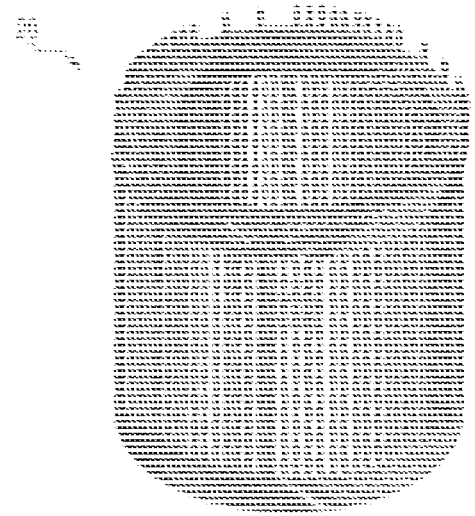
FIGS. 16a and b show a stator winding to illustrate the arrangement in a stator core in a perspective view and a top view of a longitudinal side or front side.
Figure 16B:
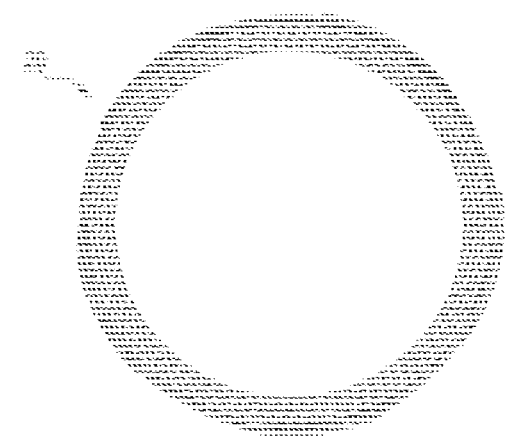

Finally, the stator winding 20 according to FIG. 11 is shown in FIGS. 16a and 16b. FIG. 16a shows a perspective illustration and FIG. 16b shows a top view of a longitudinal side or front side of the stator. The stator winding 20 comprises five identical parts 21 according to FIG. 15a, which are each arranged to be offset by 72°.

FIGS. 17-20 show further embodiments of the disclosure in which the formation of a reversal point between two winding conductors is partly dispensed with. This has the advantage over an embodiment with a reversal point that the possibility of parallel connections is increased. For the spiral arrangement with a reverse winding, a plurality of winding units can be used, which are inserted evenly over the circumference in directly connected slot sections. This also leads to restrictions in the connection options. Only the exact number of poles/2 winding units can be used.

Especially with more powerful machines (>200 kW), parallel connections of the winding units must be increasingly carried out. If an end of the wire is generated instead of the reversal point, it is possible to use this in addition to the connection.

When the individual winding units are evenly distributed over the circumference of the stator, the number of parallel branches is fixed. It is therefore desirable to be able to generate a number of parallel branches for which the number of winding units is smaller than with a uniform distribution.

If the reversal point is omitted, the ends of the wires that are released can be used as an additional connection point for parallel connections. When using the spiral arrangement of the individual winding units according to FIG. 9, a symmetrical winding can again be produced.

A variable number of winding units is generated by inserting a smaller number of individual winding units than the number of poles/2 in the stator. The slots in the individual pole areas do not have any beginnings of the wires. Here the slot base is filled by the winding units inserted in the preceding slot sections. This creates a significantly larger number of connection options, which means that the electrical machine can, if necessary, be better adapted to the voltage conditions.

The embodiments of a stator with strip-like winding units shown in FIGS. 17-20 are described below.

In FIGS. 17-20, the respective beginnings of the wires and ends of the wires of the strip-like winding units are provided with uniform reference symbols. Thus, in each of the exemplary embodiments, the beginning of the wire of a first conductor is provided with the reference symbol 30 and the end of the wire thereof with the reference symbol 31. The beginning of the wire of a second conductor is identified with the reference symbol 32, while the end thereof is referenced with the reference symbol 33. The beginning of the wire of a third conductor bears the reference symbol 34, while the end of the wire bears the reference symbol 35. The beginning of the wire of a fourth conductor is provided with the reference symbol 36. The end of the wire of the fourth conductor bears the reference symbol 37. The beginning of the wire of a fifth conductor is identified by the reference symbol 38. The end of the wire of the fifth conductor is identified with the reference symbol 39. The beginning of the wire of the sixth conductor is identified with the reference symbol 40. The end of the wire of the sixth conductor is identified with the reference symbol 41. The beginning of the wire of a seventh conductor is identified with the reference symbol 42. The end of the wire of the seventh conductor is identified with the reference symbol 43. The beginning of the wire of an eighth conductor is identified with the reference symbol 44. The end of the wire of the eighth conductor bears the reference symbol 45.

Figure 17:
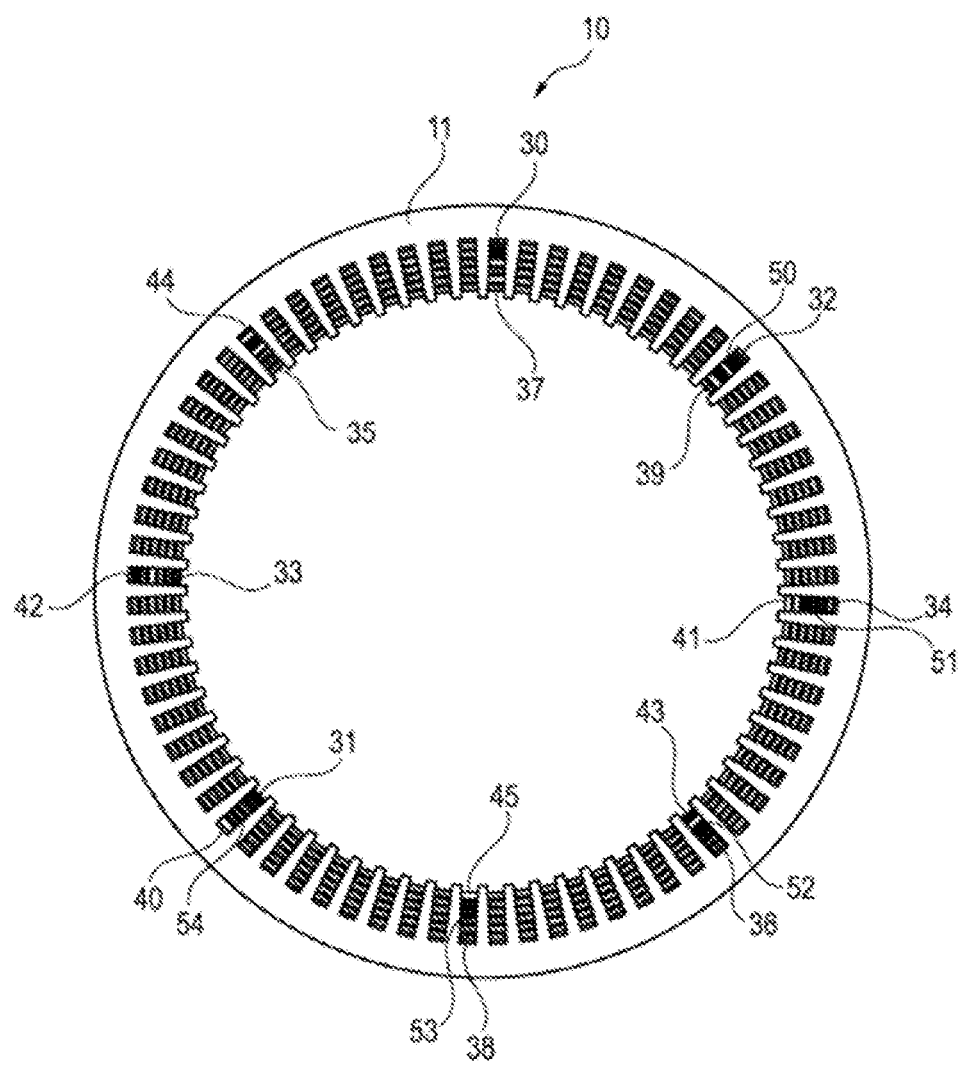
FIG. 17 shows a stator of an electrical machine with four strip-like winding units.

FIG. 17 shows a stator 10 of an electrical machine having a starter core 11 and four strip-like winding units, which are inserted into slots in the stator core. The winding is designed for a stator with 72 slots and 8 poles with 6 conductors each in the slot. The number of holes is therefore 3. For the sake of clarity, only the conductors of one slot per pole are shown. A first winding unit comprises a first conductor with the beginning of the wire 30 and end of the wire 31 and a second conductor with the beginning of the wire 32 and the end of the wire 33. A slot section of the second conductor is located in a first slot 50 in a first radial position which is arranged on the slot base. The beginning of the wire 32 of the second conductor is also connected to this slot section. A slot section of the first conductor is located adjacent to this slot section in the radial direction. Viewed relative to one another, the slot section of the first conductor is located in a first layer which is arranged above the slot section of the second conductor (hereinafter second layer). Here, a lower layer denotes a layer which, viewed from the slot base, is arranged below the respective other conductor, which is accordingly by definition in an upper layer. It can be seen that the slot section of the second conductor is arranged in a second slot 51 above the slot section of the first layer. In a third slot 52 the conditions are again reversed. That is, the layer of the slot section of the first conductor is in turn located above the layer of the slot section of the second conductor. This change of position continues until the end of the wire 31 of the first conductor is reached.

The slot section of the second conductor positioned in the first slot 50 on the slot base is connected via an end section, not shown, to a slot section in the second slot 51, which is located in a radial position that is offset by two radial positions compared to the radial position on the slot base in the first slot 50. The slot section of the second conductor in the second slot 51 is connected via a further end section, not shown, to a slot section in the third slot 52, the radial position of which corresponds to the slot section of the second conductor in the second slot 51. The slot section in the third slot 52 of the second conductor is connected via an end section, not shown, to a slot section in a fourth slot 53, which is offset by two radial positions from the slot section of the second conductor in the third slot 52.

The radial positions of the first conductor between the first slot 50 and a fifth slot 54 follow an analogous course. From the first slot 50 to the second slot 51, the radial position of the slot sections of the first conductor is unchanged. In contrast, the radial position changes by two radial positions between the second slot 51 and the third slot 52. From the third slot 52 to the fourth slot 53, the radial position again remains unchanged. From the fourth slot 53 to the fifth slot 54, the radial position is again offset by two positions.

The above-described arrangement of the slot sections of the conductors of a winding unit in relation to the layer thereof relative to one another and in relation to the radial position thereof in the slots of the stator is also found in the other winding units. Here, a second winding unit is again characterized in a simplified manner by a third conductor with the beginning of the wire 34 and the end of the wire 35 and a fourth conductor with the beginning of the wire 36 and the end of the wire 37. A third winding unit comprises a fifth conductor with the beginning of the wire 38 and the end of the wire 39 and a sixth conductor with the beginning of the wire 40 and the end of the wire 41. A fourth winding unit comprises a seventh conductor with the beginning of the wire 41 and the end of the wire 42 and an eighth conductor with the beginning of the wire 43 and the end of the wire 44.

The winding thus consists of evenly distributed winding units which are inserted in directly connected slot sections. A change compared to the embodiments according to FIGS. 3-16 is that the reversal point is omitted and the ends of the wires that are released can be used for further connection. The eight wires shown can be connected in parallel. Equalizing currents are avoided by the symmetrical structure.

Figure 18:
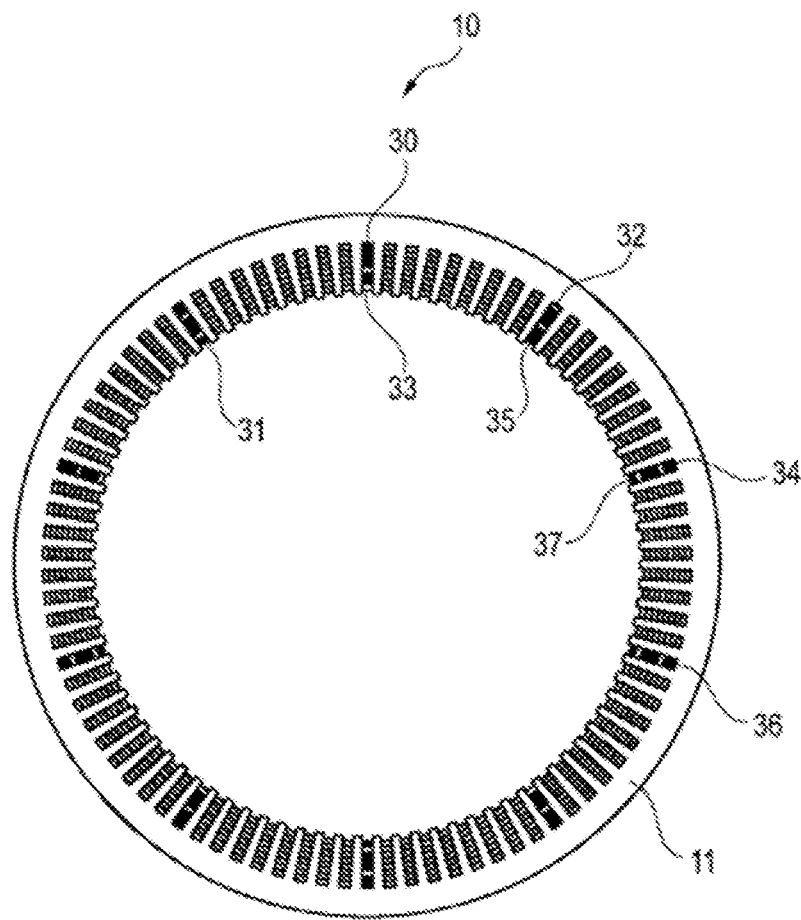
FIG. 18 shows a stator of an electrical machine with two strip-like winding units.

FIG. 18 shows a stator of an electrical machine with two strip-like winding units. You can see a stator winding configuration with 10 poles and 3 holes, here with 90 slots. There are 8 conductors in each of the slots. Of the only two winding units, only two conductors with the corresponding beginnings of the wires and ends of the wires thereof are shown for the sake of clarity. Therefore there are a total of 4 beginnings of the wires 30, 32, 34, 36, and 4 ends of the wires 31, 33, 35, 37. In total, only 4 slots show a beginning of the wire in the illustration. This means that 4 windings are connected in parallel. The remaining slots are filled with the slot sections belonging to the beginnings of the wires. The winding units are placed asymmetrically in the stator to concentrate the beginning of the wire on a segment of the stator. The connection elements can thus be arranged in a locally concentrated manner, and series production is simplified. A slight asymmetry arises, which need not necessarily lead to increased equalizing currents.

The first winding unit comprises a first conductor with the beginning of the wire 30 and the end of the wire 31 and a second conductor with the beginning of the wire 32 and the end of the wire 33. The second winding unit comprises a third conductor with the beginning of the wire 34 and the end of the wire 35 and a fourth conductor with the beginning of the wire 36 and the end of the wire 37. The pattern of the course of the relative layers and radial positions of the slot sections involved, which was described in connection with FIG. 17, is also found in this embodiment. The relative position change between the slot sections of a strip-like winding unit takes place in each slot in which two slot sections of the same strip-like winding unit are arranged, while the offset of the adjacent slot sections of a conductor by two or no radial positions only occurs when the entire strip-like winding unit is changed in the radial position thereof. This happens, for example, in slots in which the beginnings of wires are located.

Figure 19:
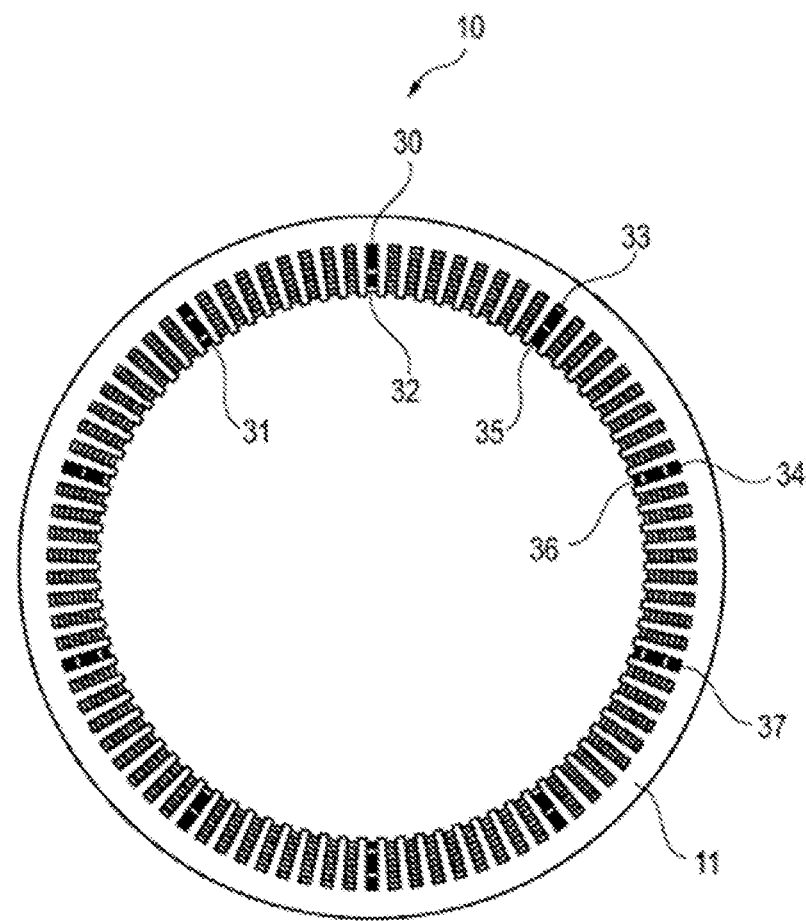
FIG. 19 shows a stator of an electrical machine with two strip-like winding units, each of which is designed as a reverse winding.

FIG. 19 shows a stator of an electrical machine with two strip-like winding units, each of which is designed as a reverse winding. A first conductor with the beginning of the wire 30 forms a running wave that ends at the end of the wire 31. A second conductor with the beginning of the wire 32 forms a returning wave that ends at the end of the wire 33. The first and second conductors together form a strip-like winding unit.

To form a reversal point, the end of the wire 31 of the first conductor and the beginning of the wire 32 of the second conductor are interconnected by a bent end section, which is not shown in the figure. This can be a separate connection which, for example, creates a galvanic connection between the first and the second conductor via a weld or solder point. It is also possible, however, for the first conductor and the second conductor to be designed as a one-piece wire which, before being inserted into the stator slots, has already been shaped as such to form a forward and return wave.

In a similar manner, a second strip-like winding unit with a reversal point is formed by a third conductor with the beginning of the wire 34 and the end of the wire 35, and a fourth conductor with the beginning of the wire 36 and the end of the wire 37. The reversal point lies between the end of the wire 35 of the third conductor and the beginning of the wire 36 of the fourth conductor, as in the case of the first winding mat of this embodiment, on the side of the winding head facing the air gap. This can be a separate connection which, for example, creates a galvanic connection between the third and fourth conductor via a weld or solder point. It is also possible, however, for the third conductor and the fourth conductor to be designed as a one-piece wire which, before being inserted into the stator slots, has already been shaped as such into a forward and return wave.

Figure 20:
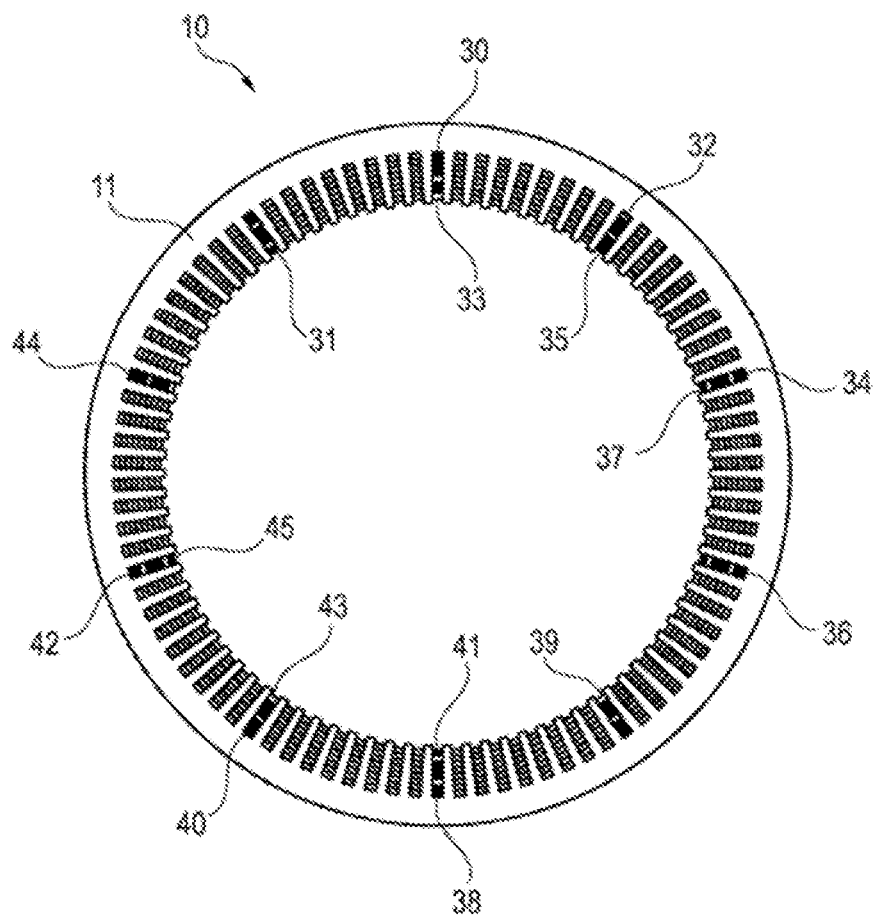
FIG. 20 shows a further stator of an electrical machine with four strip-like winding units.

FIG. 20 shows a further stator of an electrical machine with four strip-like winding units. The stator consists of 90 slots that form 10 poles. Here, too, there are again 8 conductors in one slot. Here 4 winding units with 8 beginnings of the wires 30, 32, 34, 36, 38, 40, 42, 44 are used. This means that 8 windings can be connected in parallel. Not every pole has a beginning of the wire 30, 32, 34, 36, 38, 40, 42, 44. This configuration can only be achieved in this arrangement, since such a parallel connection can neither be achieved via the number of holes (q=3) nor via the number of poles 10.

Figure 21:
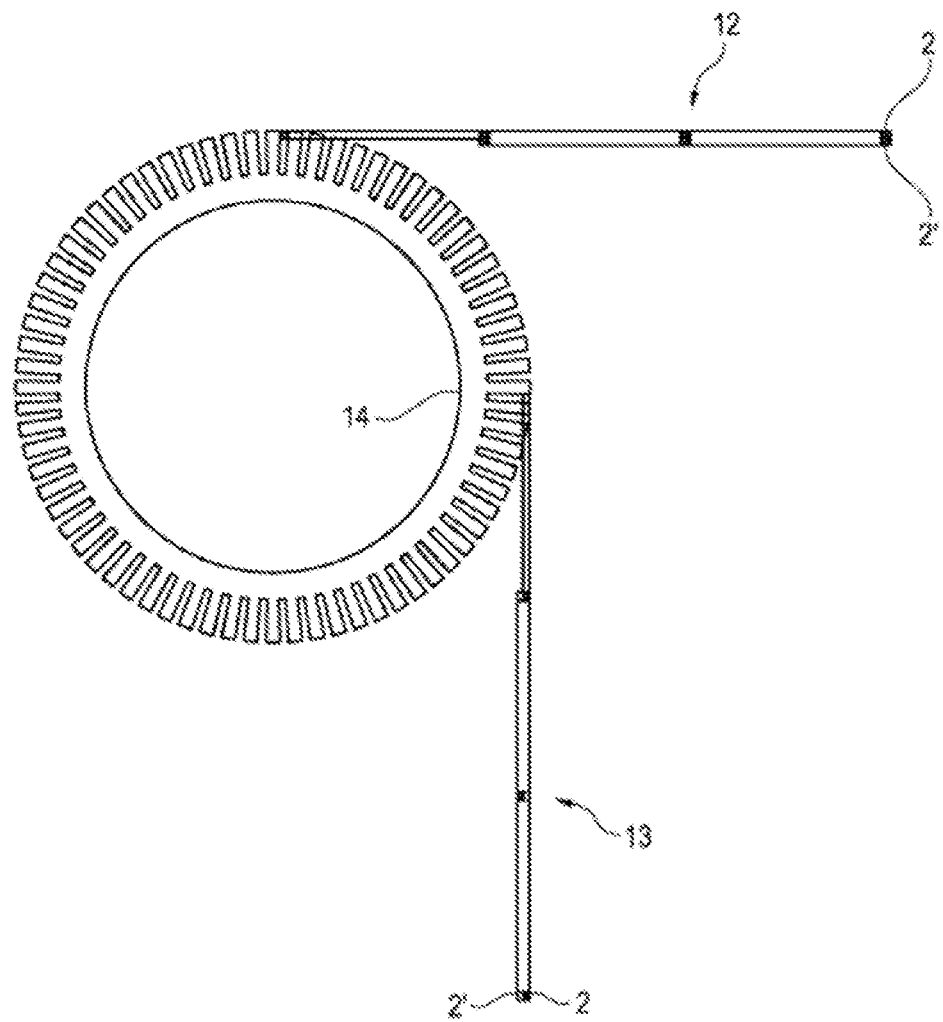
FIGS. 21 to 23 show process steps for producing a spiral winding from two strip-like winding units according to an embodiment of the disclosure.
Figure 22:
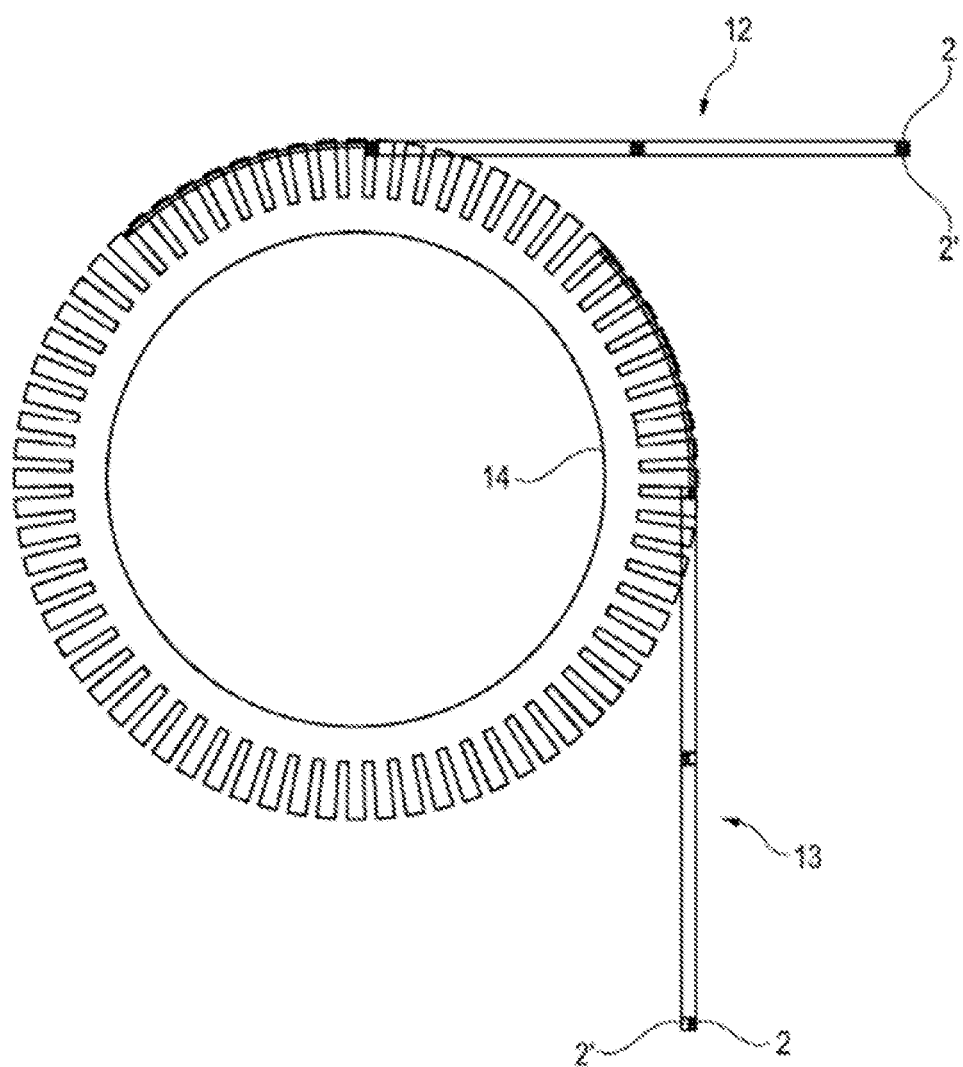
Figure 23:
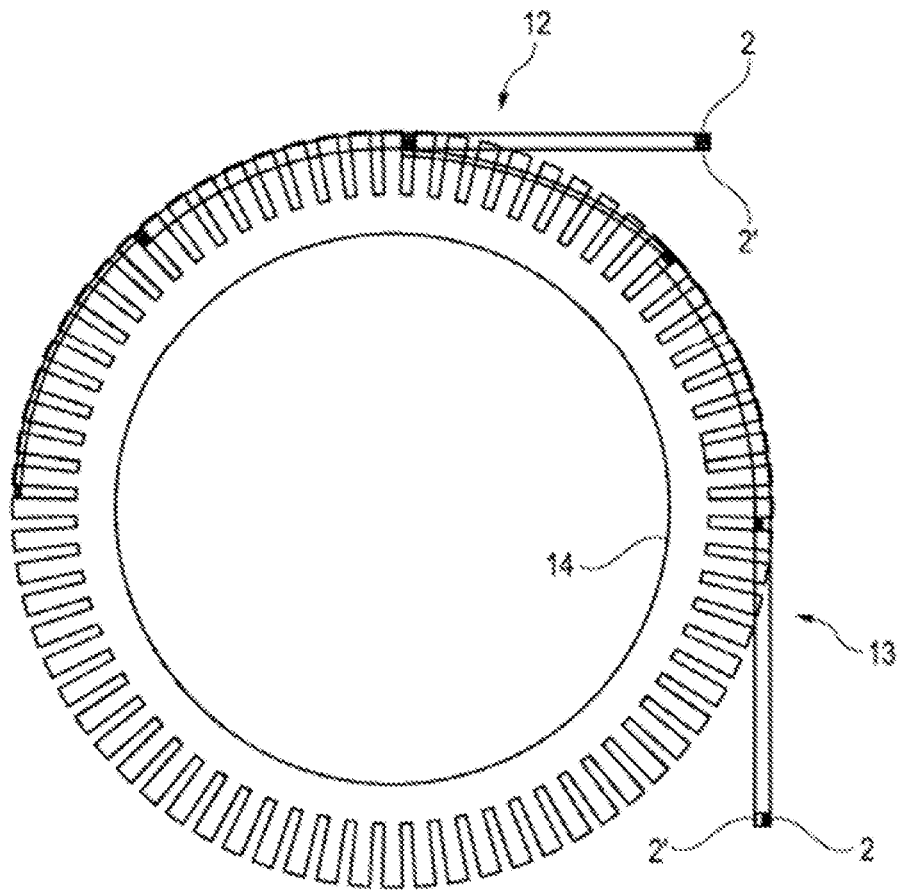
Figure 24:
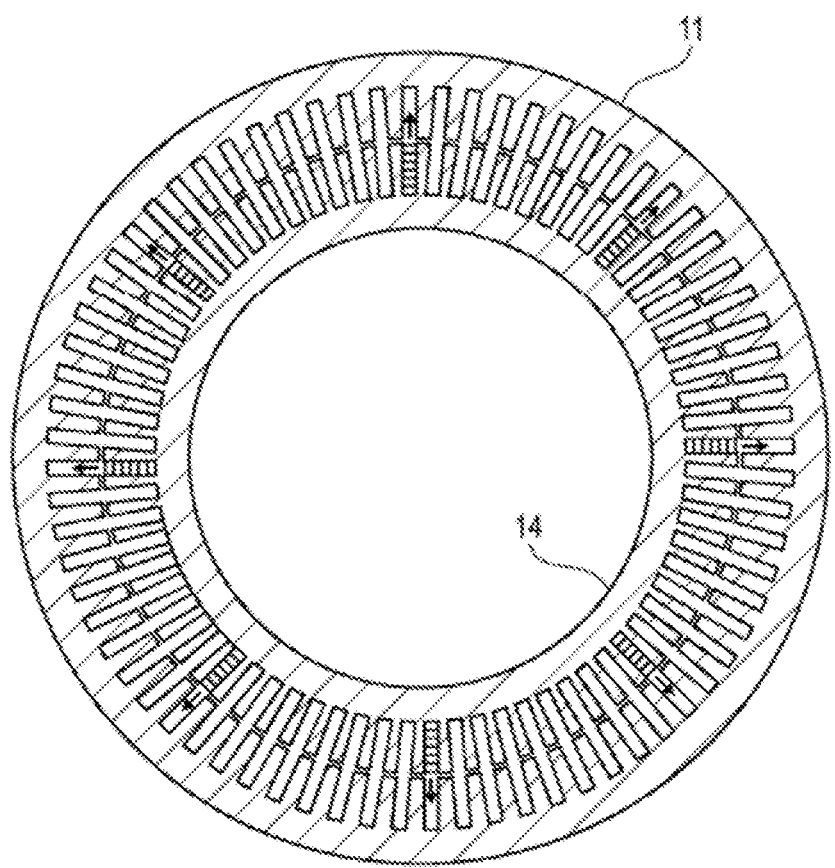
FIG. 24 shows a method step for transferring the spiral winding into the slots of a stator.

FIGS. 21 to 23 show method steps for producing a spiral winding from two strip-like winding units according to an embodiment of the disclosure. A transmission tool is shown in the form of a transmission mandrel 14, which is used to transmit the stator winding into the stator core.

As an example, FIGS. 21-32 show the application of a first and a second winding unit 12, 13 to the transmission mandrel, wherein, for the sake of clarity, the two winding units 12, 13 are represented here only by a first and a second winding conductor 2, 2'. The winding conductors 2, 2' can each have a beginning of the wire and an end of the wire or, alternatively, can be connected via a reversal point to form a reverse winding, so that each of the winding units 12, 13 has only half of the winding connections as in a winding without a reversal point.

As can be seen, the winding units 12, 13 are introduced offset in the circumferential direction of the transmission mandrel into slots of the transmission mandrel. The winding units 12, 13 in FIG. 21 initially still have a flat, lateral shape when the first slot sections are arranged in slots of the transmission mandrel 14. After the first slot sections of the respective winding units are fixed in the slots, the transmission mandrel 14 is rotated counterclockwise (see FIG. 22). As a result, a spiral deformation of the strip-like winding units 12, 13 begins, which finally continues when the transmission mandrel 14 is rotated further. In this case, all of the slot sections of the winding units 12, 13 are successively drawn into slots in the transmission mandrel 14.

In some of the slots of the transmission mandrel 14, slot sections of the first winding unit 12 overlap with slot sections of the second winding unit 13—this can be seen in FIG. 23 through the simplified illustration with only two slots. This overlap results in the already repeatedly mentioned course of the radial positions of the slot sections in the slots, as explained in connection with the subject matter according to claim 1.

The winding units 12, 13 applied in this way to the transmission mandrel are then introduced into the inwardly open slots of a stator. For this purpose, the transmission mandrel 14 equipped with the winding units 12, 13 is first inserted axially into the cylindrical interior of a stator. The slot sections are then expanded radially out of the slots in the transmission mandrel 14 into the slots in the stator. This method step is shown by way of example in FIG. 24.

The exemplary embodiments described above are not to be understood as limiting. It is possible to manufacture winding units according to the disclosure with a different number of conductors and stators according to the disclosure with a different number of slots, number of pole pairs and a different slot factor. In particular, the number of radial positions is not limited to eight, but can be less, for example four, five or six, or greater, for example nine or ten. Furthermore, the number of slots is not limited to three, but can deviate therefrom, for example the number of slots can be two or four. The number of pole pairs and/or the number of phases can also assume values other than those shown.

LIST OF REFERENCE SYMBOLS 1, 1', 1", 1''', 1'''' Winding unit
2, 2', 2" Winding conductor
3, A, B Slot section
4 Connection section
5 First end section
6, 6' Second end section
7 First subsection
8 Second subsection
9 Bending point
10 Stator
11 Stator core
12 First winding unit
13 Second winding unit
14 Transmission mandrel
20 Stator winding
21 Part of a stator winding
30 Beginning of the wire of the first conductor
31 End of the wire of the first conductor
32 Beginning of the wire of the second conductor
33 End of the wire of the second conductor
34 Beginning of the wire of the third conductor
35 End of the wire of the third conductor
36 Beginning of the wire of the fourth conductor
37 End of the wire of the fourth conductor
38 Beginning of the wire of the fifth conductor
39 End of the wire of the fifth conductor
40 Beginning of the wire of the sixth conductor
41 End of the wire of the sixth conductor
42 Beginning of the wire of the seventh conductor
43 End of the wire of the seventh conductor
44 Beginning of the wire of the eighth conductor
45 End of the wire of the eighth conductor
50 First slot
51 Second slot
52 Third slot
53 Fourth slot
54 Fifth slot
L1, L2 Layer of the winding unit
N Slot
Q Transverse direction
RP Radial position

The invention claimed is:

1. A stator for an electric machine, comprising:
a stator core that includes a plurality of slots that are spaced apart in a circumferential direction and have a depth running in a radial direction; and
a stator winding that includes a strip-like winding unit comprising a first winding conductor and a second winding conductor, wherein each of the first winding conductor and the second winding conductor comprise:
a plurality of straight slot sections that run in a transverse direction of the winding unit and are arranged in parallel;
a plurality of first bent end sections that each interconnect two slot sections of the associated first winding conductor and second winding conductor and are arranged on a first longitudinal side of the winding unit; and
a plurality of second bent end sections that each interconnect two slot sections of the associated first winding conductor and second winding conductor and are arranged on a second longitudinal side of the winding unit, which second longitudinal side is situated opposite the first longitudinal side;
wherein a first slot section is arranged in a first slot in a first radial position and a second slot section that is directly connected to the first slot section by a first end section is arranged in a second slot in a second radial position that is offset by two radial positions in relation to the first radial position.

2. The stator of claim 1, wherein the plurality of slots of the stator core are configured to allow an arrangement of slot sections of the stator winding into a plurality of radially spaced-apart radial positions.

3. The stator of claim 1, wherein the first winding conductor and the second winding conductor are run in a first layer and a second layer comprising the winding unit.

4. The stator of claim 3, wherein the first bent sections and the second bent end sections each interconnect a slot section of the associated first winding conductor and second winding conductor in the first layer and a slot section of the associated first winding conductor and second winding conductor in the second layer.

5. The stator of claim 4, wherein a third slot section is arranged in the first slot in a third radial position and a fourth slot section that is directly connected to the third slot section by a second end section is arranged in the second slot in a fourth radial position.

6. The stator of claim 5, wherein the fourth radial position is identical to the third radial position.

7. The stator of claim 5, wherein the third radial position is offset by one radial position from the first radial position.

8. The stator of claim 5, wherein a fifth slot section directly connected to the second slot section by a second end section is arranged in a third slot in a fifth radial position that is identical to the second radial position.

9. A stator winding for an electric machine, comprising:
    a winding unit comprising a first winding conductor and a second winding conductor; and
    a reverse winding connected to the first winding conductor and connected to the second winding conductor by a third bent end section at a reversal point, wherein two connection sections for the reverse winding are formed from the interconnected first winding conductor and second winding conductor, and wherein the two connection sections are both arranged on a first longitudinal side and in a same layer of the winding unit.

10. The stator winding of claim 9, wherein one slot section each of the first winding conductor and the second winding conductor in a first layer are interconnected by the third bent end section.

11. The stator winding of claim 9, wherein one slot section each of the first winding conductor and the second winding conductor in a second layer are interconnected by the third bent end section.

12. The stator winding of claim 9, wherein the winding unit further includes one or more winding conductors that are substantially identical to the first winding conductor and the second winding conductor and are offset such that the first winding conductor, the second winding conductor, and the one or more winding conductors are arranged in the same layer of the winding unit.

13. A winding method for a stator of an electric machine, comprising:
    generating a first winding unit and a second winding unit;
    applying the first winding unit and the second winding unit to a cylindrical transmission mandrel;
    shifting the transmission mandrel axially into an interior space surrounded by a stator core;
    expanding the first winding unit and the second winding unit radially outward from the transmission mandrel into a plurality of slots of the stator core;
    arranging a plurality of slot sections of the first winding unit in the plurality of slots of a stator core that are spaced apart in a circumferential direction; and
    arranging a plurality of slot sections of the second winding unit in the plurality of slots of the stator core that are spaced apart in a circumferential direction, such that the second winding unit is offset in the circumferential direction relative to the first winding unit and the plurality of slot sections comprising the first winding unit and the second winding unit are arranged in the same slots;
    wherein a first slot section is arranged in a first slot in a first radial position and a second slot section that is directly connected to the first slot section by a first end section is arranged in a second slot in a second radial position that is offset by two radial positions in relation to the first radial position.

14. The method of claim 13, wherein generating the first winding unit and the second winding unit includes generating at least a first winding conductor and a second winding conductor so that they run in a first layer and a second layer of each of the first winding unit and the second winding unit.

15. The method of claim 13, wherein applying includes offsetting the first winding unit and the second winding unit from one another in the circumferential direction as applied to the cylindrical transmission mandrel.

\* \* \* \* \*